(12) United States Patent
Guthrie et al.

(10) Patent No.: US 9,619,390 B2
(45) Date of Patent: Apr. 11, 2017

(54) PROACTIVE PREFETCH THROTTLING

(75) Inventors: Guy L. Guthrie, Austin, TX (US); William J. Starke, Round Rock, TX (US); Jeffrey Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1836 days.

(21) Appl. No.: 12/649,548

(22) Filed: Dec. 30, 2009

(65) Prior Publication Data
US 2011/0161587 A1 Jun. 30, 2011

(51) Int. Cl.
*G06F 12/02* (2006.01)
*G06F 12/0862* (2016.01)
*G06F 12/0815* (2016.01)

(52) U.S. Cl.
CPC ...... *G06F 12/0862* (2013.01); *G06F 12/0815* (2013.01)

(58) Field of Classification Search
CPC .................................................. G06F 12/0862
See application file for complete search history.

(56) References Cited

U.S. PATENT DOCUMENTS

| 5,835,946 A | 11/1998 | Allen et al. |
| 6,748,501 B2 | 6/2004 | Arimilli et al. |
| 7,228,385 B2 | 6/2007 | Guthrie et al. |
| 7,254,678 B2 | 8/2007 | Alexander et al. |
| 7,475,191 B2 | 1/2009 | Guthrie et al. |
| 7,533,227 B2 | 5/2009 | Guthrie et al. |
| 2009/0198965 A1* | 8/2009 | Arimilli et al. ............... 712/207 |
| 2011/0113199 A1* | 5/2011 | Tang et al. .................... 711/130 |

OTHER PUBLICATIONS

Steiner et al—"A Characterization of a Java-Based Commercial Workload on a High-End Enterprise Server"; ACM Digital Library; pp. 379-380; Jun. 2006.
Wang et al.—"Parallelization of IBM Mambo System Simulator in Functional Modes"; ACM Digital Library; pp. 71-76; 2007-2008.

* cited by examiner

*Primary Examiner* — Charles Rones
*Assistant Examiner* — Ryan Dare
(74) *Attorney, Agent, or Firm* — Brian F. Russell; Joseph Petrokaitis (57) ABSTRACT

According to a method of data processing, a memory controller receives a plurality of data prefetch requests from multiple processor cores in the data processing system, where the plurality of prefetch load requests include a data prefetch request issued by a particular processor core among the multiple processor cores. In response to receipt of the data prefetch request, the memory controller provides a coherency response indicating an excess number of data prefetch requests. In response to the coherency response, the particular processor core reduces a rate of issuance of data prefetch requests.

24 Claims, 10 Drawing Sheets

PROACTIVE PREFETCH THROTTLING

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, data prefetching.

2. Description of the Related Art

As system memory latencies have increased in terms of processor clock cycles, computer architects have applied significant design effort to improvements in data caching (for handling previously used data) and data prefetching (for retrieving data in anticipation of use). Enhancements to data caching and data prefetching tend to be complementary in that enhancements to data caching techniques tend to achieve greater latency reductions for applications having significant data reuse, while enhancements to data prefetching tend to achieve greater latency reductions for applications having less data reuse.

In operation, hardware data prefetchers generally detect patterns of memory accesses forming one or more sequential address streams. A sequential address stream is defined as any sequence of memory accesses that reference a set of cache lines with monotonically increasing or decreasing addresses. The address offset between the addresses of adjacent memory accesses in a particular sequential address stream is often referred to as the "stride". In response to a detection of a sequential address stream, the hardware data prefetcher then prefetches up to a predetermined number of cache lines into a low latency data cache in advance of a current demand memory access.

Unfortunately, in many designs, aggressive data prefetching can exacerbate already lengthy demand memory access latencies by overwhelming memory controllers with a large number of data prefetch requests.

SUMMARY OF THE INVENTION

In at least some embodiments, a memory controller receives a plurality of data prefetch requests from multiple processor cores in the data processing system, where the plurality of prefetch load requests include a data prefetch request issued by a particular processor core among the multiple processor cores. In response to receipt of the data prefetch request, the memory controller provides a coherency response indicating an excess number of data prefetch requests. In response to the coherency response, the particular processor core reduces a rate of issuance of data prefetch requests.

DETAILED DESCRIPTION OF ILLUSTRATIVE EMBODIMENT

Figure 1A:
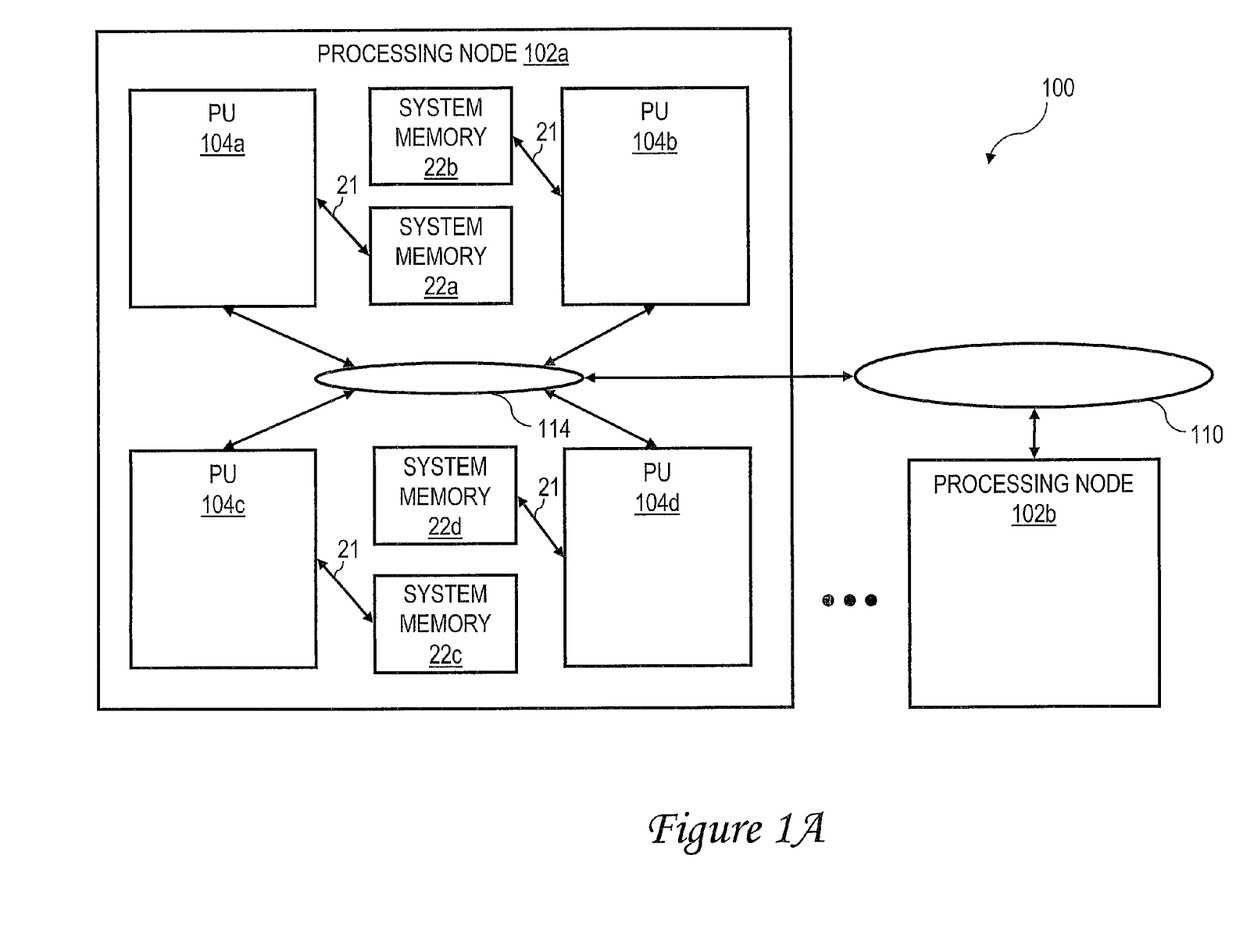
FIG. 1A is a high level block diagram of an exemplary data processing system in accordance with one embodiment.

With reference now to the figures and, in particular, with reference to FIG. 1, there is illustrated a high level block diagram of an exemplary embodiment of a cache coherent symmetric multiprocessor (SMP) data processing system in accordance with one embodiment. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 22a-22d. System memories 22a-22d of all of processing units 104 collectively form the lowest level of volatile memory within data processing system 100, which is generally accessible to all processing units 104 via request transactions issued on interconnect 110 and/or 114. In the depicted embodiment, access to system memories 22 is controlled by integrated memory controllers (IMCs) 206 in processing units 104 (see FIG. 2, infra), which each communicates with an external system memory 22 via a high frequency, high bandwidth memory bus 21. Of course, in alternative embodiments, memory controllers for one or more system memories 22 can be coupled to system interconnect 110 or local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of disclosed embodiments, they are not illustrated in FIG. 1 or discussed further herein. It should also be understood, however, that the enhancements provided herein are applicable to data processing systems of diverse architectures and are in no way limited to the generalized data processing system architecture illustrated in FIG. 1.

Figure 1B:
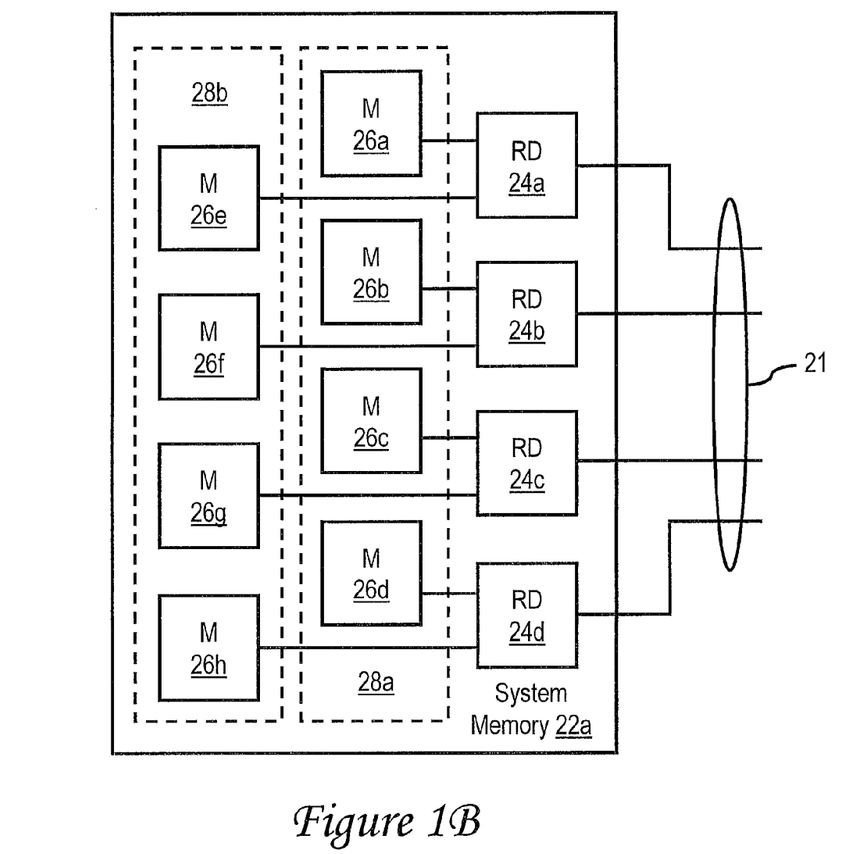
FIG. 1B is a more detailed block diagram of an exemplary system memory in accordance with one embodiment.

Referring now to FIG. 1B, in an exemplary embodiment each system memory 22 is implemented with multiple redrive (RD) chips 24a 24d, each providing address and data connections for multiple (in this case two) Dynamic Random Access Memory (DRAM) Dual Inline Memory Modules (DIMMs) 26. That is, RD chip 24a is connected to DIMMs 26a, 26e; RD chip 24b is connected to DIMMs 26b, 26f; RD chip 24c is connected to DIMMs 26c, 26g; and RD chip 24d is connected to DIMMs 26d, 26h. The DIMMs 26 comprising each system memory 22 are further organized into multiple "ranks" 28a-28b each containing one DIMM 26 connected to each of RD chips 24a-24d. For example, rank 28a includes DIMMs 26a-26d, and rank 28b includes DIMMs 26e-26h. Real memory addresses may be "striped" across the DIMMs 26 comprising each rank 28 so that access latency for full cache line memory accesses is reduced.

Figure 1C:
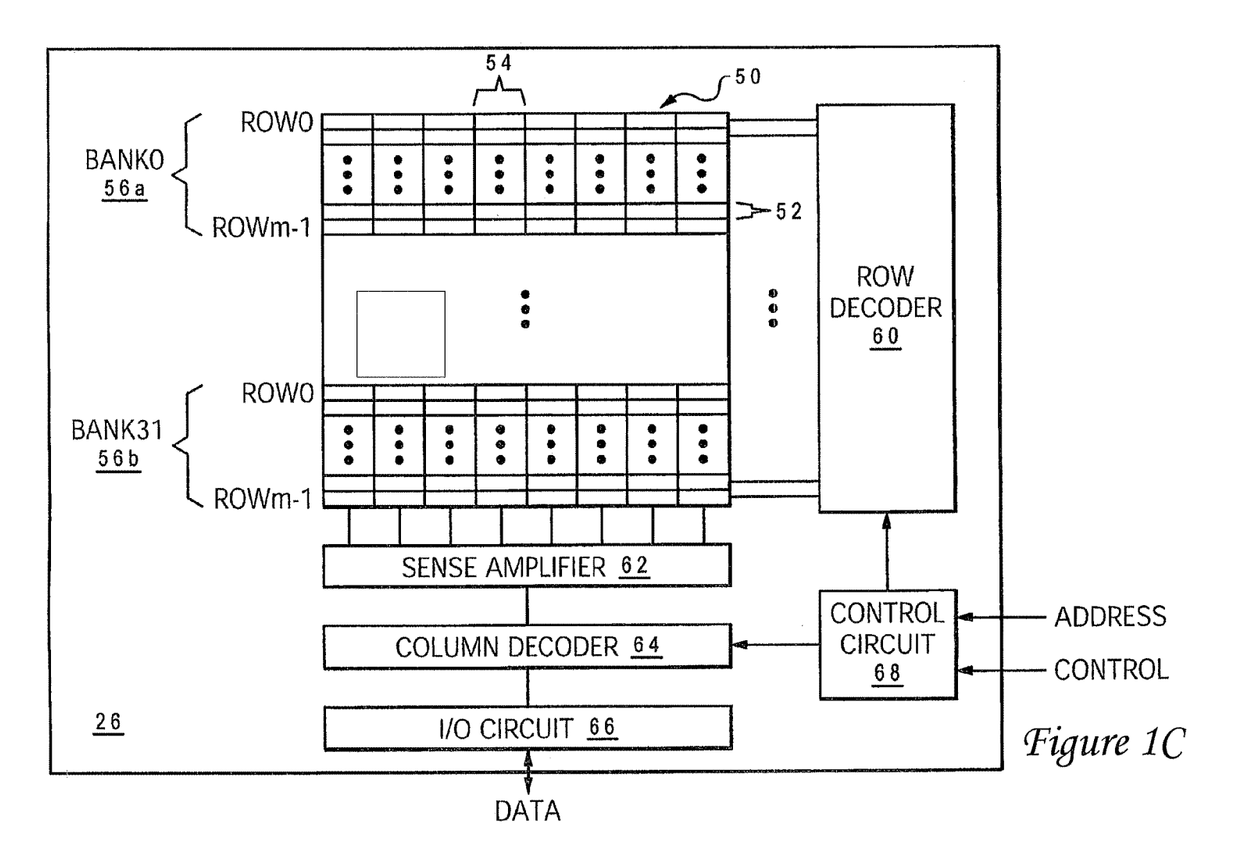
FIG. 1C is a more detailed block diagram of an exemplary system memory module in accordance with one embodiment.

Referring now to FIG. 1C, there is illustrated a more detailed block diagram of an exemplary implementation of a DIMM 26 within data processing system 100 of FIG. 1. As shown, DIMM 26 includes a DRAM memory array 50 containing a number of rows 52 and columns 54 of DRAM memory cells, with each combination of a row and column corresponding to a particular unique real memory address. As indicated, in the exemplary embodiment, each column 54 is 32 bytes wide, meaning that a memory access specifying the real address of a 128-byte word will be serviced by reference to one column (32 bytes) of data from each of the four DIMMs 26 within the relevant rank 28. In order to provide enhanced access bandwidth, rows 52 are organized into multiple (in this example, 32) banks 56 (e.g., 56a, 56b) of m rows 52, and memory array 50 supports concurrent access to one row 52 in each of the 32 banks. As should be apparent, the width of memory columns, the number of banks and ranks, and implementation-dependent parameters described herein will vary between embodiments.

DIMM 26 further includes a control circuit 68, row decoder 60, sense amplifier 62, column decoder 64 and I/O circuit 66 that are utilized to perform read and write accesses to memory array 50 in response to control signals and addresses (and if a write access, data) received from IMC 206 (FIG. 2) via a RD chip 24. IMC 206 initiates a memory access to a DIMM 26 by asserting or deasserting a read/write (R/W) control line and supplying a real address to an RD chip 24, which in turn, supplies the control signal and real address to the DIMM 26. Control circuit 68 within the DIMM 26 latches at least the row portion of a real address presented by the associated RD chip 24 in response to assertion of a Row Access Select (RAS) line. Row decoder 60 then decodes row portion of the real address to read out a particular row 52 within memory array 50. If the row address resolves to a different row than the immediate previous access to memory array 50, control circuit 68 precharges sense amplifiers 62 during a precharge period ($t_{RP}$).

Control circuit 68 similarly latches a column portion of the real address of interest in response to assertion of a Column Access Select (CAS) line, which follows the assertion of the RAS line by a latency period $t_{RCD}$ in order to permit the row signal to settle. The column portion of the real address is decoded by column decoder 64, which transfers the bytes of data associated with the real memory address between the sense amplifier 62 and I/O circuit 66. The period between assertion of CAS and the appearance of correct data at the output pins of I/O circuit 66 is referred to as $t_{CAC}$.

Figure 2:
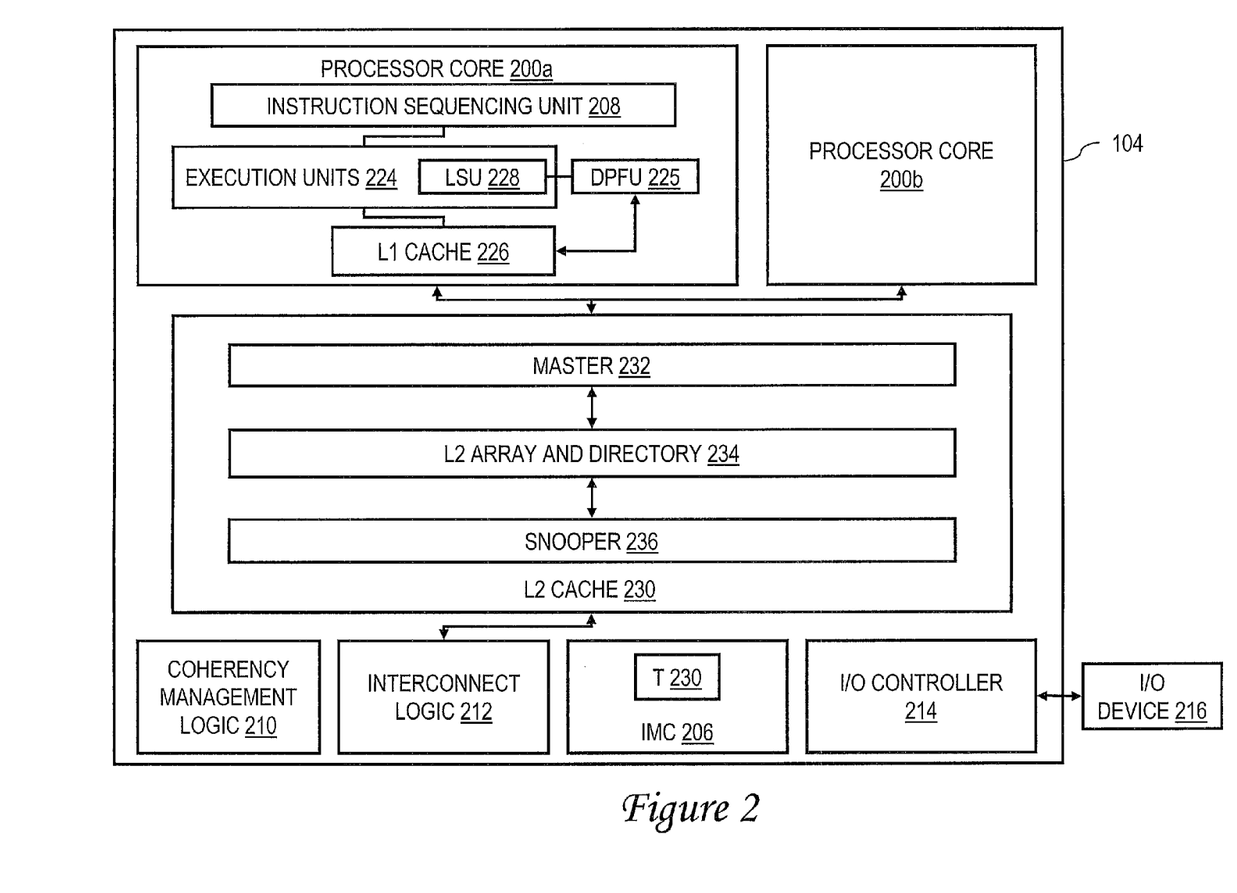
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 includes two processor cores 200a, 200b for independently processing instructions and data. Each processor core 200 includes at least an instruction sequencing unit (ISU) 208 for prefetching and demand fetching instructions and for ordering instructions for execution by one or more execution units 224. Execution units 224 preferably include a load-store unit (LSU) 228 for executing memory access instructions that reference a memory block or cause the generation of an operation referencing a memory block. In at least some embodiments, each processor core 200 is capable of simultaneously executing instructions within two or more hardware threads of execution. Each processor core 200 preferably includes a data prefetch unit (DPFU) 225 that prefetches data into low latency cache memory advance of demand by instructions executed by processor cores 200.

The operation of each processor core 200 is supported by a multi-level volatile memory hierarchy having at its lowest level shared system memories 22a-22d, and at its upper levels one or more levels of cache memory. In the depicted embodiment, each processing unit 104 includes an integrated memory controller (IMC) 206 that controls read and write access to a respective one of the system memories 22a-22d within its processing node 102 in response to a stream of demand and prefetch requests received from local processor cores 200a-200b and operations snooped on the local interconnect 114.

In the illustrative embodiment, the cache memory hierarchy of processing unit 104 includes a store-through level one (L1) cache 226 (which may be bifurcated into separate L1 instruction and data caches) within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line, lookaside or victim cache, which may be fully inclusive, partially inclusive, or non-inclusive of the contents the upper levels of cache.

Each processing unit 104 further includes an instance of coherency management logic 210, which implements a portion of the distributed snoop or directory-based coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
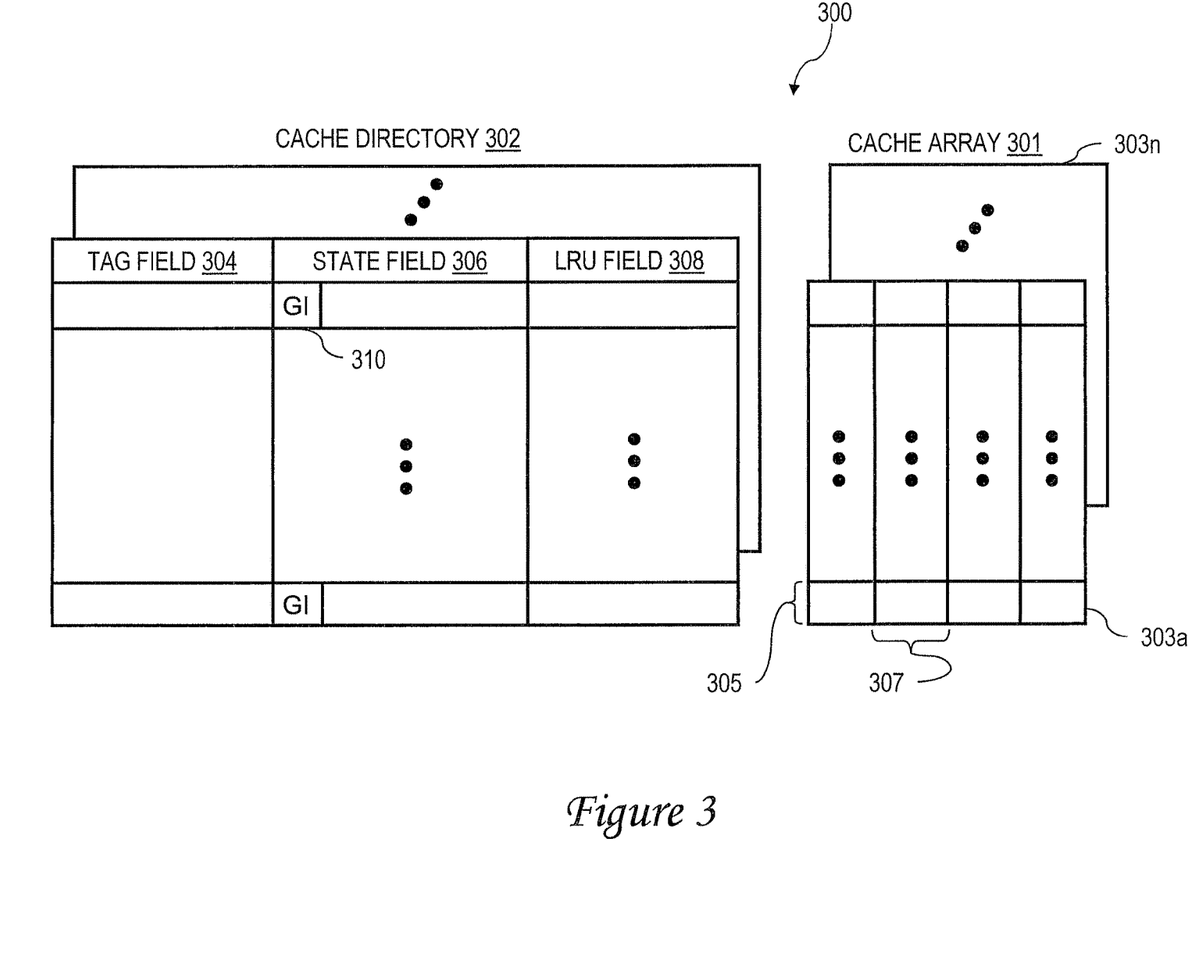
FIG. 3 is a more detailed block diagram of an exemplary cache array and directory in accordance with one embodiment.

With reference now to FIG. 3, there is illustrated a more detailed block diagram of an exemplary embodiment of a cache array and directory 300, which may be utilized, for example, to implement the cache array and directory of an L1 cache 226 or L2 cache array and directory 234. As illustrated, cache array and directory 300 includes a set associative cache array 301 including multiple ways 303a-303n. Each way 303 includes multiple entries 305, each providing temporary storage for up to a full cache line of data, e.g., 128 bytes. Each cache line of data is logically formed of multiple granules 307 (in this example, four granules of 32 bytes each) that may correspond in size, for example, to the smallest allowable access to system memories 22. In accordance with one embodiment, granules 307 may be individually accessed and cached in cache array 301.

Cache array and directory 300 also includes a cache directory 302 of the contents of cache array 301. As in conventional set associative caches, memory locations in system memories 22 are mapped to particular congruence classes within cache arrays 301 utilizing predetermined index bits within the system memory (real) addresses. The particular cache lines stored within cache array 301 are recorded in cache directory 302, which contains one directory entry for each cache line in cache array 301. As understood by those skilled in the art, each directory entry in cache directory 302 comprises at least a tag field 304, which specifies the particular cache line stored in cache array 300 utilizing a tag portion of the corresponding real address, a LRU (Least Recently Used) field 308 indicating a replacement order for the cache line with respect to other cache lines in the same congruence class, and a state field 306, which indicates the coherency state of the cache line.

According to one embodiment, coherency states that may be utilized in state field 306 to indicate state information may be defined by the well-known MESI coherency protocol or a variant thereof. To support caching of partial cache lines in cache array 301, cache directory 302 preferably indicates which granule(s) 307 are cached in the associated entry 305. For example, in one embodiment, each state field 306 includes a granule identifier (GI) 310 that indicates which granule(s) of the cache line identified by the tag in tag field 304 are held in the associated entry 305 of cache array 301. In at least some embodiments, when GI 310 indicates that fewer than all granules of a cache line are held in the associated entry 305, state field 306 preferably indicates a "Partial" coherency state that indicates that less than the complete cache line is held by cache array 301. In such embodiments, the Partial coherency state functions like the Shared coherency state of the MESI protocol, meaning that a full copy of the cache line must be obtained prior to modification of the contents of the cache line.

Figure 4:
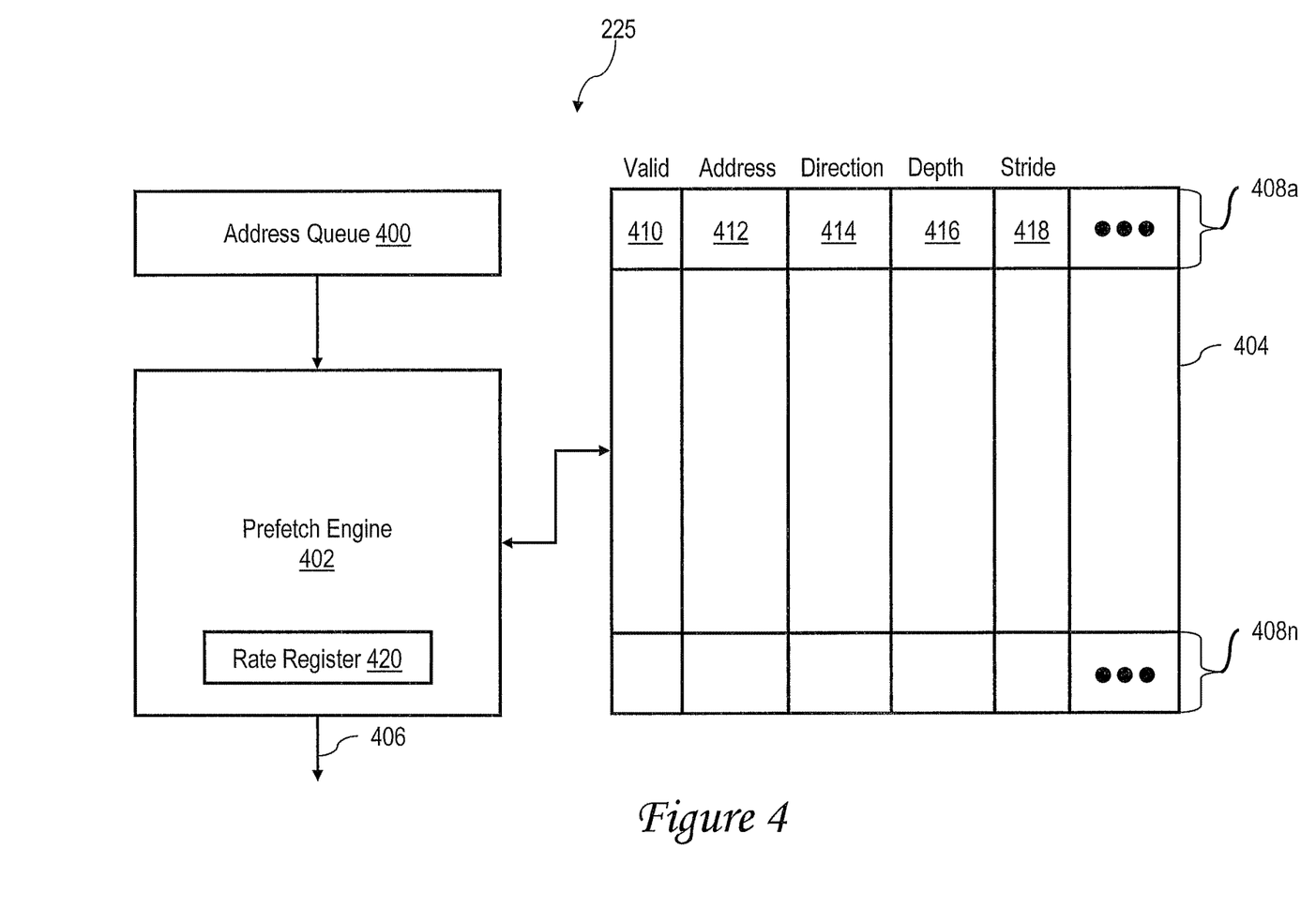
FIG. 4 is a more detailed block diagram of the data prefetch unit of FIG. 1.

Referring now to FIG. 4, there is depicted a more detailed block diagram of an exemplary data prefetch unit (DPFU) 225 in accordance one embodiment. As shown, DPFU 225 includes an address queue 400 that buffers incoming memory access addresses generated by LSU 228, a prefetch request queue (PRQ) 404, and a prefetch engine 402 that generates data prefetch requests 406 by reference to PRQ 404.

Prefetch requests 406 cause data from the memory subsystem to be fetched or retrieved into L1 cache 228 and/or L2 cache 230 preferably before the data is needed by LSU 228. The concept of prefetching recognizes that data accesses frequently exhibit spatial locality. Spatial locality suggests that the address of the next memory reference is likely to be near the address of recent memory references. A common manifestation of spatial locality is a sequential data stream, in which data from a block of memory is accessed in a monotonically increasing (or decreasing) sequence such that contiguous cache lines are referenced by at least one instruction. When DPFU 225 detects a sequential data stream (e.g., references to addresses in adjacent cache lines), it is reasonable to predict that future references will be made to addresses in cache lines that are adjacent to the current cache line (the cache line corresponding to currently executing memory references) following the same direction. Accordingly, DPFU 225 generates data prefetch requests 406 to retrieve one or more of these adjacent cache lines before the program actually requires them. As an example, if a program loads an element from a cache line n, and then loads an element from cache line n+1, DPFU 225 may prefetch cache some or all of cache lines n+2 and n+3, anticipating that the program will soon load from those cache lines also.

As further depicted in FIG. 4, in at least some embodiments, PRQ 404 includes a plurality of stream registers 408. In the depicted embodiment, each stream register 408 contains several fields describing various attributes of a corresponding sequential data stream. These fields include a valid field 410, an address field 412, a direction field 414, a depth field 416, a stride field 418, and optionally, one or more additional fields. Valid field 410 indicates whether or not the contents of its stream register 408 are valid. Address field 402 contains the base address (effective or real) of a cache line or partial cache line in the sequential data stream. Direction field 414 indicates whether addresses of cache lines in the sequential data stream are increasing or decreasing. Depth field 416 indicates a number of cache lines or partial cache lines in the corresponding sequential data stream to be prefetched in advance of demand. Stride field 418 indicates an address interval between adjacent cache lines or partial cache lines within the sequential data stream.

In the depicted embodiment, prefetch engine 402 generates data prefetch requests in each of the data streams identified by stream registers 408 at a rate governed by the contents of rate register 420. For example, prefetch engine 402 may cycle through all of the active data streams in PRQ 404 in a round robin manner generating one or more prefetch requests in each stream, with the total rate of such prefetch requests across all data streams being equal to or less than a maximum rate indicated by rate register 420.

Figure 5A:
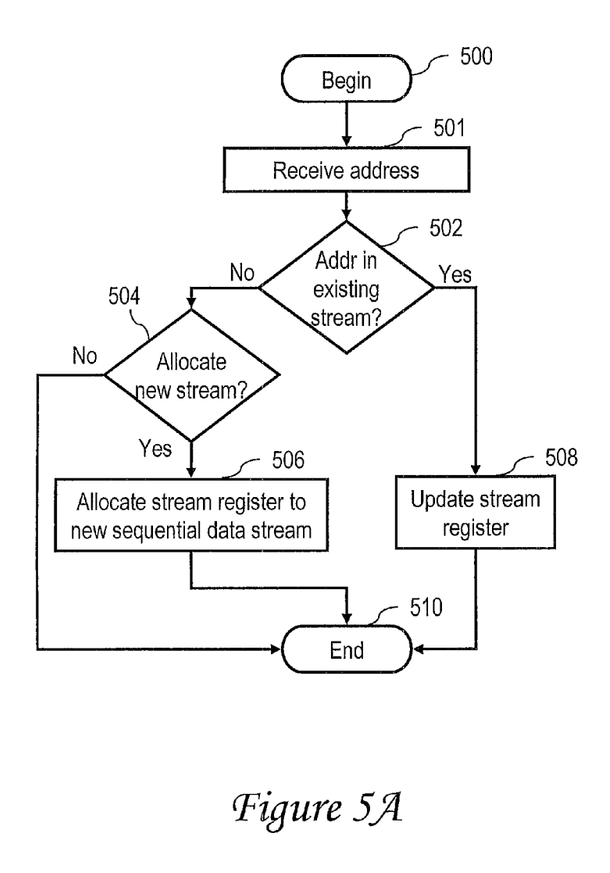
FIG. 5A is a high level logical flowchart of an exemplary process by which a data prefetch unit allocates entries in a prefetch request queue in accordance with one embodiment.

With reference now to FIG. 5A, there is depicted a high level logical flowchart of an exemplary process by which DPFU 225 allocates entries in PRQ 404 in accordance one embodiment. The process begins at block 500 and the proceeds to block 501, which depicts DPFU 225 receiving from LSU 228 within address queue 400 a memory access address (e.g., effective or real address) of a demand memory access. The process then proceeds to block 502, which depicts prefetch engine 402 of DPFU 225 determining by reference to PRQ 404 whether or not the address received at block 501 falls within an existing sequential data stream to which a stream register 408 has been allocated. If prefetch engine 402 determines at block 504 that the address belongs to an existing sequential data stream, the process proceeds to block 508, which is described below. If prefetch engine 402 determines at block 504 that the address does not belong to an existing sequential data stream, prefetch engine 402 determines at block 504 whether or not to allocate a new sequential data stream, for example, based upon a miss for the memory access address in L1 cache 226, the availability of an unallocated stream register 408, and/or previous receipt of a closely spaced memory access address.

If prefetch engine 402 determines to not allocate a new sequential data stream at block 504, the process shown in FIG. 5 simply terminates at block 510. If however, prefetch engine 402 determines to allocate a new sequential data stream at block 504, prefetch engine 402 allocates one of stream registers 408 to the sequential data stream and populates fields 410-420 of the allocated stream register 408. Allocation of the stream register 408 may entail selection of a stream buffer 408 based upon, for example, the contents of usage history fields 420 of stream registers 408 and/or unillustrated replacement history information indicating a stream register 408 to be replaced according to a replacement algorithm, such as Least Recently Used (LRU) or round robin. Following block 506, the process terminates at block 510.

Referring now to block 508, in response to a determination that the memory access address received at block 501 falls within an existing sequential data stream to which a stream register 408 has been allocated in PRQ 404, prefetch engine 402 updates the state of the stream register 408 allocated to the sequential data stream. For example, prefetch engine 402 may update address field 412 with the memory access address or modify depth field 416 or stride field 418. Following block 508, the process terminates at block 510.

Figure 5B:
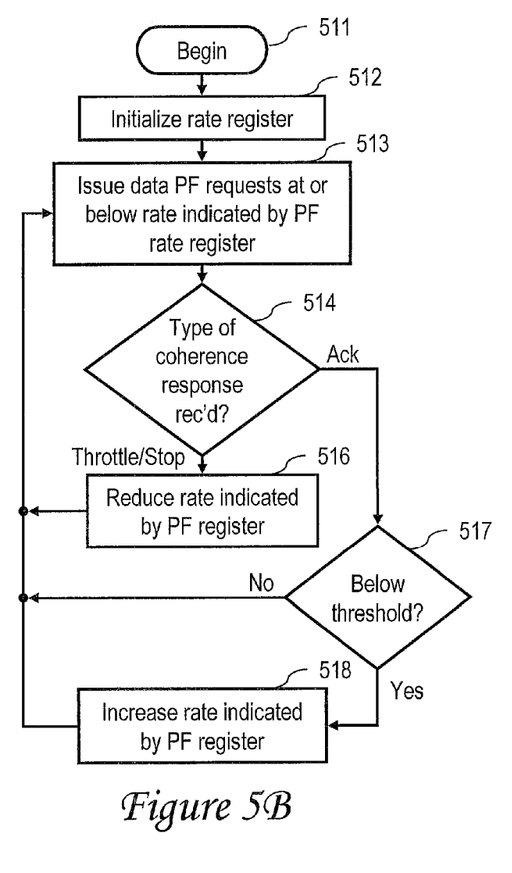
FIG. 5B is a high level logical flowchart of an exemplary process by which a data prefetch unit adjusts its prefetch rate in accordance with one embodiment.

Referring now to FIG. 5B, there is depicted a high level logical flowchart of an exemplary process by which a prefetch engine 402 generates data prefetch requests in accordance with one embodiment. The process begins at block 511 and then proceeds to block 512, which depicts initialization of the rate register 420 of a prefetch engine 402 to an initial value, for example, by system firmware at system startup. As noted above, the contents of rate register 420 indicate a maximum rate at which prefetch engine 402 is permitted to issue data prefetch requests.

Thereafter, during operation of data processing system 100, prefetch engine 402 issues data prefetch requests at or below the maximum rate indicated by the contents of rate register 420 (block 513). For example, in one embodiment, prefetch engine 402 rotates through the active data streams recorded in its stream registers 408 in a round robin manner, generating a predetermined number of data prefetch requests for each data stream, with the total rate of data prefetch requests being less than or equal to the rate specified by rate register 420.

Prefetch engine 402 first passes a data prefetch request to the local L1 cache 226 coupled to DPFU 225. If the data prefetch request hits in L1 cache 226, then processing of the data prefetch request ends. If, however, the data prefetch request misses in L1 cache 226, then the data prefetch request is passed further down the local cache hierarchy until a hit occurs or all level of cache memory in the local cache hierarchy have been consulted without a hit. In response to hit at one of the lower levels of the local cache hierarchy, cache memory in which the data prefetch request hits passes the target cache line of the data prefetch request up the local cache hierarchy to a predetermined level (e.g., L1 cache 226 or L2 cache 230), which then holds the target cache line for low latency access by an associated processor core 200.

If, however, the data prefetch request misses at all levels of the local cache hierarchy, interconnect logic 212 issues the data prefetch request on the interconnect fabric for servicing by another cache hierarchy or IMC 206. In one embodiment, in cases in which the data prefetch request is issued on the interconnect fabric, each L2 cache 230 and IMC 206 snooping the data prefetch request may provide to coherency management logic 210 a partial response representing its individual coherence response to the data prefetch request. An instance of coherence management logic 210 collects and combines all of the partial responses and provides to the issuing prefetch engine 402 a combined response representing a systemwide coherence response to the data prefetch request.

Returning to FIG. 5B, the process proceeds from block 513 to block 514, which depicts prefetch engine 402 determining the type of coherence response (e.g., a combined response) received in response to one of its data prefetch requests. If prefetch engine 402 determines at block 514 that an Acknowledge coherence response is received for a data prefetch request, the process proceeds to blocks 517-518, which depict prefetch engine 402 increasing the rate of issuance of data prefetch requests indicated by its rate register 420 if the current rate indicated by rate register 420 is less than a predetermined threshold rate. In various embodiments, the rate of increase can be predetermined, selected within a range pseudo-randomly by prefetch engine 402, or specified by the Acknowledge coherence response.

If, at block 514, prefetch engine 402 determines that a coherence response indicating a reduction in the rate of issuance of data prefetch requests, then prefetch engine 402 reduces the rate indicated by its rate register 420, as shown at block 516. For example, in one embodiment, an IMC 206 may generate a Stop partial response to indicate a temporary cessation of data prefetch requests or may generate a Throttle partial response to indicate a temporary reduction in the rate of issuance of data prefetch requests. These partial responses then cause coherency management logic 210 to generate a Stop combined response or a Throttle combined response, respectively. In response to a Throttle or Stop coherence response, prefetch engine 402 reduces the rate of issuance of data prefetch requests indicated by rate register 420, as indicated at block 516. Again, the reduction in the rate indicated by rate register 420 can be predetermined, pseudo-randomly selected in a range, or specifically indicated by the coherency response (e.g., a Stop coherence response is an explicit indication to set the rate indicated by rate register 420 to zero). Following either block 516 or block 518, the process returns to block 513, which has been described.

Figure 5C:
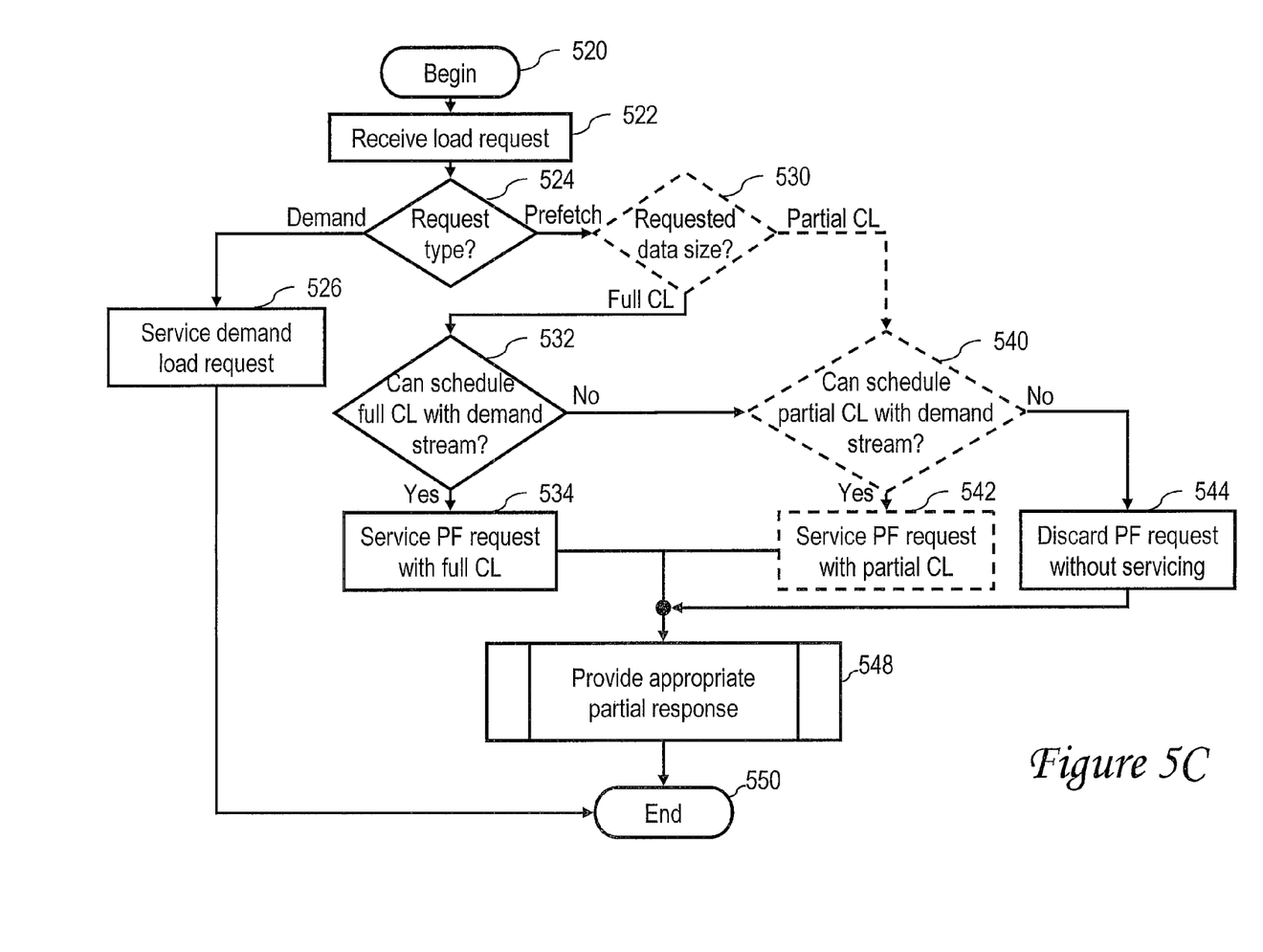
FIG. 5C is a high level logical flowchart of an exemplary process by which a memory controller services data prefetch requests in accordance with one embodiment.

With reference now to FIG. 5C, there is illustrated a high level logical flowchart of an exemplary process by which a memory controller 206 selectively services data prefetch requests with differing amounts of data in accordance with one embodiment. It should be understood that in a typical operating scenario, multiple instances of the process shown in FIG. 5C will be in progress at the same time at each of multiple IMCs 206, with the data prefetch requests being originated by prefetch engines 402 in multiple, different processor cores 200.

The process depicted in FIG. 5C begins at block 520 and then proceeds to block 522, which illustrates an integrated memory controller (IMC) 206 (FIG. 2) receiving a load request from a processor core 200 in its processing unit 104 or in another processing unit 104 via local interconnect 114. In response to receipt of the load request, IMC 206 determines at block 524 the type of load request, and in particular, whether the load request is a demand load request or a data prefetch request 406. If IMC 206 determines at block 524 that the load request is a demand load request, IMC 206 services the demand load request in a conventional manner, as depicted at block 526. Thereafter, the process terminates at block 550.

Returning to block 524, if IMC 206 determines at block 524 that the load request is a data prefetch request 406, IMC 206 optionally determines at block 530 whether the data prefetch request 406 requests a full cache line (e.g., 128 bytes) or partial cache line (e.g., 32 bytes) of prefetch data. If IMC 206 determines at optional block 530 that the received data prefetch request 406 is for a partial cache line of prefetch data, the process passes to block 540, which is described below. If, however, the data prefetch request 406 requests a full cache line of data or if block 530 is omitted, IMC 206 determines at block 532 whether access to a full cache line of prefetch data from the associated system memory 22 can be scheduled given the current stream of demand load and/or store requests received by IMC 206. In at least one preferred embodiment, the determination depicted at block 532 takes into account criteria such as power consumption, the particular ranks and banks of system memory 22 that are or will be accessed by demand requests, the impact of servicing the data prefetch request 406 on the access latency of demand requests, etc. In response to an affirmative determination at block 532, IMC 206 generates the appropriate address and control signals to cause the associated system memory 22 to provide a full cache line of data to the requesting processor core 200 in response to the data prefetch request 406, as shown at block 534 Thereafter, the process proceeds to block 548, which depicts IMC 206 providing an appropriate partial response determined based at least partially upon the currently observed demand placed on the bandwidth of IMC 206 by data prefetch requests. Thereafter, the process terminates at block 550.

Returning to block 532, if IMC 206 makes a negative determination, IMC 206 optionally determines at block 540 whether access to a partial cache line of prefetch data from the associated system memory 22 can be scheduled given the current stream of demand load and/or store requests received by IMC 206. In at least one preferred embodiment, the determination depicted at block 540 takes into account criteria such as power consumption, the particular ranks and banks of system memory 22 that are or will be accessed by demand requests, the impact of servicing the prefetch data request 406 on the access latency of demand requests, etc. In response to a negative determination at optional block 540 or if block 540 is not implemented, IMC 206 discards the data prefetch request 406 received at block 522 without servicing the data prefetch request 406 or accessing system memory 22, as shown at block 544, and the process proceeds to block 548, which has been described. The data prefetch request 406 can, of course, be discarded without being serviced without affecting correctness because such data prefetch requests, by definition, are speculative in nature.

If, however, IMC 206 makes an affirmative determination at optional block 540, IMC 206 generates the appropriate address and control signals to cause the associated system memory 22 to provide a partial cache line of data selected by IMC 206 to the requesting processor core 200 in response to the data prefetch request 406. For example, IMC 206 may reduce power consumption by electing to provide a partial cache line in response to a data prefetch request 406 if the partial cache line resides in the same row accessed by a demand request concurrently being serviced by IMC 206. Following block 542, the process proceeds to block 548, which has been described.

Figure 5D:
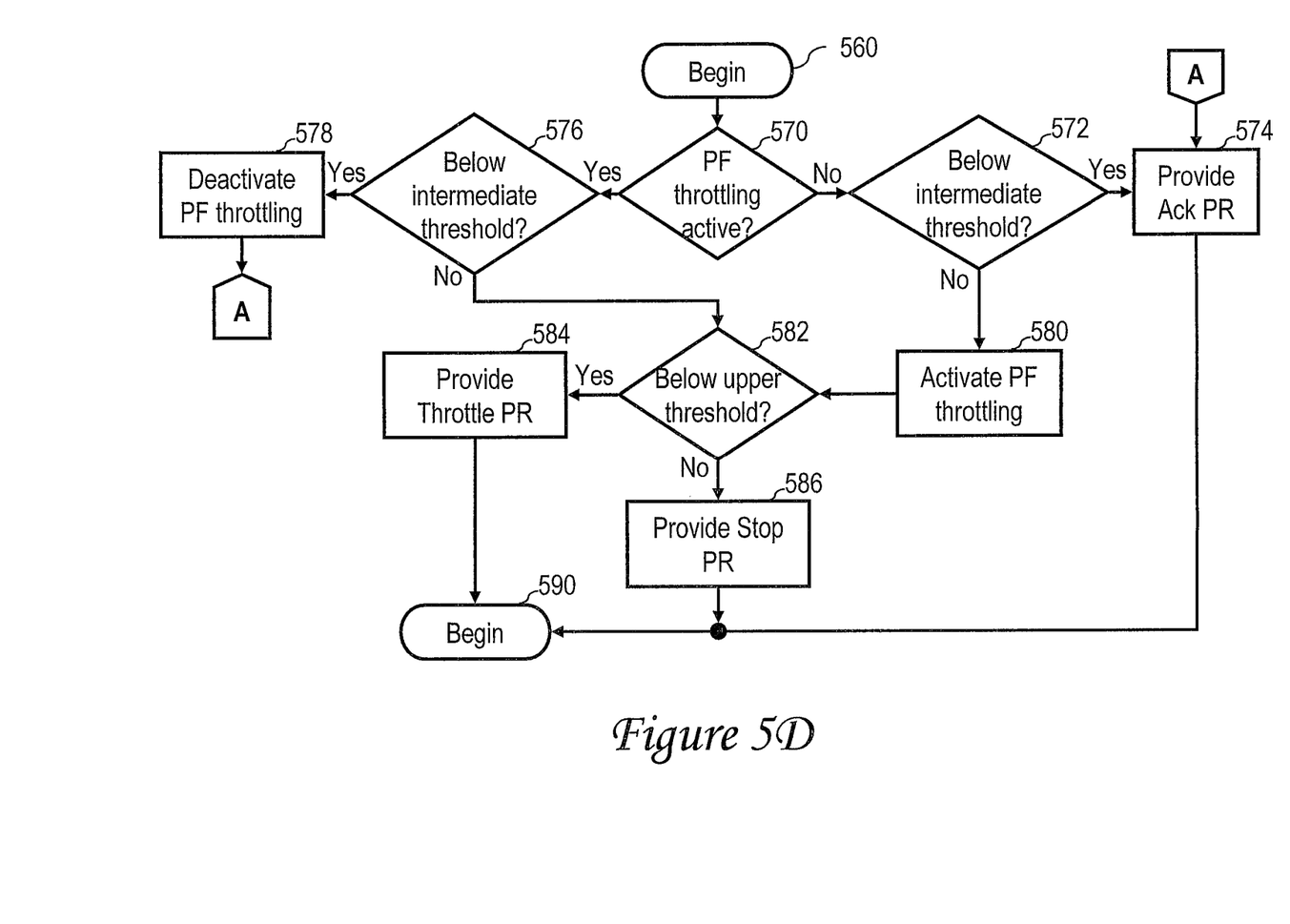
FIG. 5D is a high level logical flowchart of an exemplary process by which a memory controller adjusts the rate of issuance of data prefetch requests in accordance with one embodiment.

Referring now to FIG. 5D, there is depicted a high level logical flowchart of an exemplary process by which a memory controller of a system memory (e.g., an IMC 206) provides a coherence response to adjust the rate of issuance of data prefetch requests in accordance with one embodiment. The process shown in FIG. 5D can be performed, for example, at block 548 of FIG. 5C. In the depicted embodiment, each IMC 206 is configured (e.g., by system firmware) with multiple thresholds with respect to the number of pending prefetch requests (or rate of their receipt), for example, a lower threshold at which an IMC 206 has additional unused capacity to service data prefetch requests, an intermediate threshold at which the IMC 206 will begin to actively reduce a number of pending prefetch requests (or the rate of receipt thereof), and an upper threshold at which the IMC 206 will begin to halt issuance of prefetch requests by processors cores 200. In one embodiment, the upper threshold is set such that IMCs 206 rarely (or never) is forced to discard data prefetch requests without servicing them, as shown at block 544 of FIG. 5C.

The process of FIG. 5D begins at block 560 and then proceeds to block 570, which illustrates IMC 206 determining whether or not it is currently throttling or reducing the number or rate of receipt of data prefetch requests, for example, by consulting the state of a throttle (T) bit 230 (see FIG. 2). If IMC 206 determines that it is currently throttling data prefetch requests, the process proceeds from block 570 to block 576, which is described below. If, however, IMC 206 determines at block 570 that throttling of data prefetch requests is currently active, the process passes to block 572.

Block 572 depicts IMC 206 determining whether or not the number of pending prefetch requests (or rate of their receipt) is less than the intermediate threshold at which the IMC 206 will begin to actively reduce a number of pending prefetch requests (or the rate of receipt thereof). If so, IMC 206 provides an Acknowledge partial response (or in some embodiments, no partial response) for the data prefetch request under consideration. As described above with reference to FIG. 5B, the Acknowledge coherence response generated therefrom by coherence management logic 210 (or absence of a coherence response) causes the prefetch engine 402 that issued the data prefetch request to increase the rate of issuance of data prefetch requests indicated by its rate register 420. Following block 574, the process shown in FIG. 5D ends at block 590.

Returning to block 572, in response to a determination that the number of pending prefetch requests (or the rate of receipt thereof) is not below the intermediate threshold, IMC 206 activates throttling of data prefetch requests, for example, by setting throttle (T) bit 230 (block 580). In addition, IMC 206 determines at block 582 whether or not the number of pending prefetch requests (or the rate of receipt thereof) is less than the upper threshold. If so, IMC 206 provides a Throttle partial response to the data prefetch request (block 584). As described above with reference to FIG. 5B, a prefetch engine 402 receiving a Throttle coherence response derived from the Throttle partial response will set its rate register 420 to indicate a decreased rate of issuance of data prefetch requests. Following block 584, the process of FIG. 5D terminates at block 590.

Referring again to block 582, if IMC 206 determines that the number of pending prefetch requests (or the rate of receipt thereof) is not less than the upper threshold, IMC 206 provides a Stop partial response to the data prefetch request (block 586). In some embodiments, the Stop partial response may be implemented as a special case of a Throttle partial response that indicates that the rate of issuance of data prefetch requests should be reduced to zero. As described above with reference to FIG. 5B, a prefetch engine 402 receiving a Stop coherence response derived from the Stop partial response will set its rate register 420 to indicate temporary suspension of issuance of data prefetch requests. Following block 586, the process of FIG. 5D terminates at block 590.

With reference now to block 576, if throttling of data prefetch requests is active, IMC 206 determines whether or not the number of pending prefetch requests (or the rate of receipt thereof) is less than the intermediate threshold. If not, the process passes to block 582 and following blocks, which have been described. If, however, IMC 206 determines at block 576 that the number of pending prefetch requests (or the rate of receipt thereof) is less than the intermediate threshold, IMC 206 deactivates throttling of data prefetch requests, for example, by resetting throttle (T) bit 230 (block 578), and the process passes from block 578 through page connector A to block 574, which has been described.

Figure 6A:
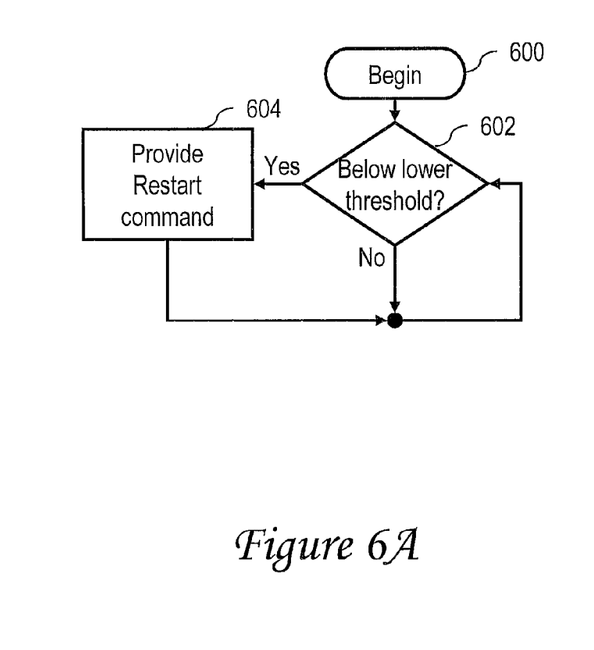
FIG. 6A is a high level logical flowchart of an exemplary process by which a memory controller restarts the issuance of data prefetch requests by at least one data prefetch unit in accordance with one embodiment.

With reference now to FIG. 6A, there is illustrated a high level logical flowchart of an exemplary process by which a memory controller (e.g., IMC 206) restarts the issuance of data prefetch requests by at least one data prefetch unit (DPFU) 225 in accordance with one embodiment. The process begins at block 600 and thereafter proceeds to block 602, which depicts an IMC 206 determining whether or not the number of pending data prefetch requests (or the rate of their receipt) is below a lower threshold. If not, the process returns to block 600. If, however, IMC 206 determines at block 602 that the number of pending data prefetch requests (or the rate of their receipt) is below the lower threshold, then IMC 206 issues a Restart command on the interconnect fabric, as shown at block 604. In various embodiments, the Restart command may be general in applicability and restart the issuance of any DPFU(s) 225 that have stopped issuing data prefetch requests in response to a Stop coherence response, or alternatively, may be targeted to restart issuance of data prefetch commands by only certain DPFU(s) 225 specified by the Restart command. Thereafter, the process returns to block 602, which has been described.

Figure 6B:
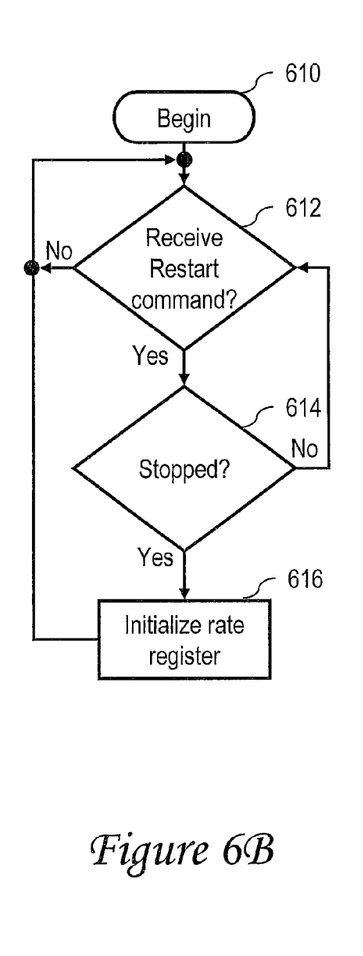
FIG. 6B is a high level logical flowchart of an exemplary process by which a data prefetch unit restarts the issuance of data prefetch requests in response to a memory controller command in accordance with one embodiment.

Referring now to FIG. 6B, there is depicted a high level logical flowchart of an exemplary process by which a DPFU 225 restarts the issuance of data prefetch requests in response to a memory controller command in accordance with one embodiment. The process begins at block 610 and then proceeds to block 612, which illustrates the prefetch engine 402 of a DPFU 225 monitoring for receipt of a Restart command issued on the interconnect fabric by an IMC 206. The process iterates at block 612 until a Restart command is received. In response to receipt of a Restart command, prefetch engine 402 determines at block 614 whether or not the setting of rate register 420 indicates that issuance of data prefetch requests by that prefetch unit 402 is currently stopped. If not, the process simply returns to block 612. If, however, prefetch unit 402 determines that its issuance of data prefetch requests is currently stopped, prefetch engine 402 reinitializes its rate register 420 to its initial value, thus restarting the issuance of data prefetch requests by that prefetch engine 402 (block 616). As noted above with reference to FIG. 6A, in some embodiments, the reinitialization of rate register 420 depicted at block 616 may be further qualified by specific DPFU targeting information specified by the Restart command. Following block 616, the process returns to block 612, which has been described.

As has been described, in at least some embodiments a memory controller of a system memory in a data processing system receives a plurality of data prefetch requests from multiple processor cores in the data processing system, where the plurality of prefetch load requests include a data prefetch request issued by a particular processor core among the multiple processor cores. In response to receipt of the data prefetch request, the memory controller providing a coherency response indicating an excess number of data prefetch requests. In response to the coherency response, the particular processor core reduces a rate of issuance of data prefetch requests.

While various embodiments been particularly shown as described, it will be understood by those skilled in the art that various changes in form and detail may be made therein without departing from the spirit and scope of the appended claims.

What is claimed is:

1. A method of data processing in a data processing system having a system memory controlled by a memory controller, said method comprising:
   receiving, by the memory controller, a plurality of data prefetch requests from multiple processor cores in the data processing system, the plurality of data prefetch requests including a data prefetch request issued by a particular processor core among the multiple processor cores, wherein the data prefetch request requests all of multiple data granules within a target line of data;
   in response to receipt of the data prefetch request by the memory controller, providing, by the memory controller, a coherency response indicating an excess number of data prefetch requests and providing data from the target line of data to the particular processor core, wherein providing data from the target line includes the memory controller providing fewer than all of the multiple data granules of the target line based on scheduling of demand requests by the memory controller, and wherein the coherency response to the data prefetch request is a partial response representing the coherency response of only the memory controller;
   in response to receipt of the partial response, generating, by coherence management logic within the data processing system, from the partial response and from one or more other partial responses of components of the data processing system, a throttle combined response representing a system-wide coherency response of the data processing system, wherein the throttle combined response is indicative of the excess number of data prefetch requests; and
   in response to the throttle combined response, reducing, by the particular processor core, a rate of issuance of data prefetch requests.

2. The method of claim 1, wherein said coherency response indicates an amount of reduction in the rate of issuance of data prefetch requests.

3. The method of claim 1, and further comprising:
   in response to a reduction in a number of data prefetch requests received by the memory controller, providing, by the memory controller, a coherency message to the particular processor core indicating availability to process additional data prefetch requests.

4. The method of claim 1, wherein the reducing comprises temporarily suspending issuance of data prefetch requests to the memory controller by the particular processor core.

5. The method of claim 4, and further comprising:
after the particular processor core temporarily suspending issuance of data prefetch requests, issuing, by the memory controller, a start command to restart issuance of data prefetch requests by the particular processor core in response to detecting less than a threshold amount of data prefetch requests.

6. The method of claim 5, wherein:
the start command restarts issuance of data prefetch requests of only the particular processor core; and
the method further comprises another of the multiple processor cores continuing to suspend issuance of data prefetch requests to the memory controller after receipt by said another of the multiple processor cores of the start command.

7. The method of claim 1, wherein:
the coherency response is a first coherency response; and
the method further comprises:
in response to the particular processor core receiving a second coherency response for a second data prefetch request, increasing, by the particular processor core, a rate of issuance of data prefetch requests by the particular processor core.

8. The method of claim 1, and further comprising discarding, by the memory controller, one or more of the plurality of data prefetch requests targeting lines of data in the system memory without servicing the one or more data prefetch requests.

9. The method of claim 8, wherein the discarding includes discarding, by the memory controller, one or more of the plurality of data prefetch requests based on at least one of a set including power consumption, banks of the system memory targeted by the plurality of data prefetch requests, and latency of demand requests.

10. An integrated circuit including:
a memory controller for a data processing system having a system memory controlled by the memory controller, wherein the memory controller is configured to:
responsive to receipt of a plurality of data prefetch requests from multiple processor cores in the data processing system, the plurality of data prefetch requests including a data prefetch request issued by a particular processor core among the multiple processor cores that requests all of multiple data granules within a target line of data:
provide a partial response for the data prefetch request representing a coherency response of only the memory controller, said partial response indicating an excess number of data prefetch requests; and
provide, to the particular processor core, at least one but fewer than all of the multiple data granules of the target line based on scheduling of demand requests by the memory controller, such that the particular processor core, responsive to a system-wide throttle combined response of the data processing system that is generated from the partial response and from one or more other partial responses of components of the data processing system and that is indicative of the excess number of data prefetch requests, reduces a rate of issuance of data prefetch requests.

11. The integrated circuit of claim 10, wherein said coherency response indicates an amount of reduction in the rate of issuance of data prefetch requests.

12. The integrated circuit of claim 11, wherein:
the coherence response indicates that the particular processor core is to temporarily suspend issuance of data prefetch requests to the memory controller; and
the memory controller, after temporarily suspending issuance of data prefetch requests by the particular processor core, issues a start command to restart issuance of data prefetch requests by the particular processor core in response to detecting less than a threshold amount of data prefetch requests.

13. The integrated circuit of claim 12, wherein:
the start command restarts issuance of data prefetch requests of only the particular processor core, such that another of the multiple processor cores continues to suspend issuance of data prefetch requests to the memory controller after receipt by said another of the multiple processor cores of the start command.

14. The integrated circuit of claim 10, wherein the memory controller, responsive to a reduction in data prefetch requests, provides a coherency message to the particular processor core indicating availability to process additional data prefetch requests.

15. The integrated circuit of claim 10, wherein the memory controller discards one or more of the plurality of data prefetch requests targeting lines of data in the system memory without servicing the one or more data prefetch requests.

16. The integrated circuit of claim 15, wherein the memory controller discards one or more of the plurality of data prefetch requests based on at least one of a set including power consumption, banks of the system memory targeted by the plurality of data prefetch requests, and latency of demand requests.

17. A data processing system, comprising:
an interconnect fabric;
multiple processor cores coupled to the interconnect fabric;
coherence management logic coupled to the interconnect fabric; and
a memory controller coupled to a system memory and coupled to the multiple processor cores by the interconnect fabric, wherein the memory controller is configured to:
receive a plurality of data prefetch requests from the multiple processor cores, the plurality of data prefetch requests including a data prefetch request issued by a particular processor core among the multiple processor cores, wherein the data prefetch request requests all of multiple data granules within a target line of data;
in response to receipt of the data prefetch request, provide a coherency response indicating an excess number of data prefetch requests and provide, to the particular processor core, at least one but fewer than all of the multiple data granules of the target line from the system memory based on scheduling of demand requests by the memory controller, wherein the coherency response to the data prefetch request is a partial response representing the coherency response of only the memory controller; and
wherein the coherence management logic, responsive to receipt of the partial response, generates, from the partial response and from one or more other partial responses of components of the data processing system, a throttle combined response representing a system-wide coherency response of the data processing system, wherein the throttle combined response is indicative of the excess number of data prefetch requests; and wherein the particular processor core, in response to the throttle combined response, reduces a rate of issuance of data prefetch requests.

18. The data processing system of claim 17, wherein said coherency response indicates an amount of reduction in the rate of issuance of data prefetch requests.

19. The data processing system of claim 17, wherein the particular processor core, responsive to receiving another coherency message indicating availability of the memory controller to process additional data prefetch requests, increases the rate of issuance of data prefetch requests.

20. The data processing system of claim 17, wherein the particular processor core reduces the rate of issuance of data prefetch requests by temporarily suspending issuance of data prefetch requests to the memory controller.

21. The data processing system of claim 20, wherein:
the particular processor core, after temporarily suspending issuance of data prefetch requests, resumes issuing data prefetch requests in response to receipt of a start command from the memory controller.

22. The data processing system of claim 17, wherein:
the coherency response is a first coherency response; and the particular processor core, responsive to receiving a second coherency response for a second data prefetch request, increases its rate of issuance of data prefetch requests.

23. The data processing system of claim 17, wherein the memory controller discards one or more of the plurality of data prefetch requests targeting lines of data in the system memory without servicing the one or more data prefetch requests.

24. The data processing system of claim 23, wherein the memory controller discards one or more of the plurality of data prefetch requests based on at least one of a set including power consumption, banks of the system memory targeted by the plurality of data prefetch requests, and latency of demand requests.

\* \* \* \* \*